United States Patent
Numminen

(10) Patent No.: US 8,412,758 B2
(45) Date of Patent: Apr. 2, 2013

(54) SYSTEM AND METHOD FOR IMPLEMENTING A RANDOM NUMBER GENERATOR

(75) Inventor: Michael Numminen, Sävedalen (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 1174 days.

(21) Appl. No.: 12/097,205

(22) PCT Filed: Dec. 12, 2005

(86) PCT No.: PCT/EP2005/013312
§ 371 (c)(1),
(2), (4) Date: Nov. 14, 2008

(87) PCT Pub. No.: WO2007/068264
PCT Pub. Date: Jun. 21, 2007

(65) Prior Publication Data
US 2009/0222501 A1 Sep. 3, 2009

(51) Int. Cl.
*G06F 7/58* (2006.01)
(52) U.S. Cl. ................................................ 708/250
(58) Field of Classification Search ................ None
See application file for complete search history.

(56) References Cited

U.S. PATENT DOCUMENTS

| | | | | |
|---|---|---|---|---|
| 3,691,472 A * | 9/1972 | Bohman | ............ | 327/164 |
| 6,112,094 A * | 8/2000 | Dent | ............ | 455/452.1 |
| 6,834,291 B1 * | 12/2004 | Pugh et al. | ............ | 708/252 |
| 7,933,310 B2 * | 4/2011 | Numminen et al. | ............ | 375/132 |
| 2002/0172359 A1 * | 11/2002 | Saarinen | ............ | 380/46 |

* cited by examiner

*Primary Examiner* — Lewis A Bullock, Jr.
*Assistant Examiner* — Christine Dang

(57) ABSTRACT

The invention refers to a pseudo random number generator, PRN, and a method for producing a random number signal, and a system for a fast frequency hopping radio comprising a PRN, and a method for such a system.

17 Claims, 3 Drawing Sheets

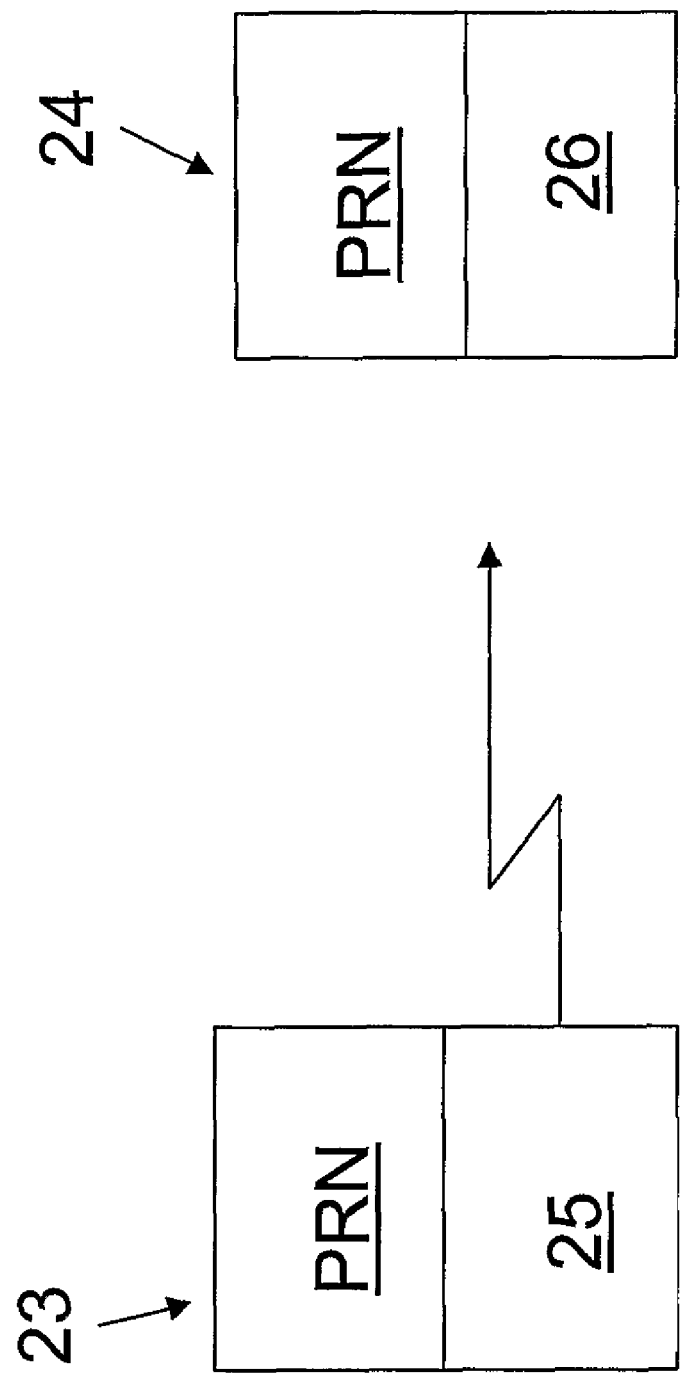

SYSTEM AND METHOD FOR IMPLEMENTING A RANDOM NUMBER GENERATOR

ABBREVIATIONS

PRN Random Number Generator
LCG: Linear Congurential Generators.
MGC: More General Congruence.
ML: Maximum Length.
PMMLCG: PrimeModulus LCG.

TECHNICAL FIELD

The invention refers to a pseudo random number generator, PRN, and a method for producing a random number signal, and a system for a fast frequency hopping radio comprising a PRN, and a method for such a system.

BACKGROUND ART

Within the field of data communication and radio communications, the technology known as "spread spectrum" is often employed in order to make a deterministic-signal appear stochastic. Such a signal will be similar to white noise, thus making it very difficult to understand an intercepted signal. Furthermore, it may also be used when trying to suppress fading.

One known method for achieving "spread spectrum" is fast frequency hopping. The frequency employed at any given moment in such a system is determined by a random frequency generator comprising a PRN, which is driven by a synchronization signal known both a receiver and transmitter, in order to enable the receiver to "follow" the frequencies used by the transmitter In the field of random number generators it is known a number of techniques to generate a random number or signal. Examples of PRNs are ML-sequencer; and Linear Congurential Generators (LCG); and More General Congurence (MGC); and Prime Modulus LCG (PMMLCG).

A conventional binary PRN, such as the ML-sequencer, comprises in its simplest form a shift register which has feed back signals from two or more sockets at predetermined positions from the register. The feed back signals are added to each other and then fed back to the register.

Another conventionally PRN, such as the Linear Congurential Generators (LCG) or the More General Congurence (MGC) or the Prime Modulus LCG (PMMLCG), is driven by an input signal. The output signal is fed back to the PRN and used for further generation of the random number signal.

Common for all above mentioned PRNs are that they are strongly dependent on its previous state, which has the disadvantage that a disturbance in a signal in the PRN will propagate in the PRN and give rise to fault propagation.

Such fault propagation may cause a serious error in a one way communication system comprising a sender and a receiver. The PRN is here used to generate a scrambled signal that must be correct in order for the receiver to be able to unscramble the signal and retract important information that can be relied upon without confirmation to the sender.

Furthermore, it has long been known a PRN with feed forward control using the so called Tiny Encryption Algorithm by David Wheeler and Roger Needham. However, this PRN uses a great number of addition operators and XOR operators in order to achieve a result matching the PRN using signal feed back as mentioned above. The known forward control PRN uses too many operators for the system to be cost efficient both regarding manufacturing and regarding energy consumption. The many operators may also be too complex for the PRN to be implemented in system using the above spread spectrum.

Therefore, there is a long felt need for an improved PRN with no fault propagation and minimised number of operators.

DISCLOSURE OF INVENTION

The invention is intended to remedy the above stated problems by use of a pseudo random number generator (hereinafter called PRN) that does not involve the problem of fault propagation and at the same time minimises the number of operators. The invention also refers to a method for a PRN generating reliable pseudo random numbers.

The PRN comprises a first input terminal, a second input terminal and a third input terminal.

The first input terminal is arranged to receive a deterministic first signal. The deterministic signal may be a time signal or a time variant signal. In a system comprising a sender and a receiver using the PRN, the deterministic first signal must be the same signal with the same characteristic for both the sender and the receiver.

The second input terminal is arranged to receive a second signal being a constant signal. The constant signal is an arbitrary binary number.

The third input terminal is arranged to receive a third signal being a seed signal. The seed signal is a binary number and the key for scrambling a signal in the sender and the key for unscrambling in the receiver. The seed signal must be known for both the sender and the receiver.

The constant signal is a binary signal with a number of T bits. The deterministic first signal is a binary signal with a number of T times 2 bits. The seed signal is a binary signal with a number of T times 4 bits. The first input terminal divides the deterministic first signal into two equal parts being the first deterministic signal and the second deterministic signal. The third input terminal divides the seed signal into four equal parts being the first seed signal, the second seed signal, the third seed signal, and the fourth seed signal.

The PRN comprises a first shift register, a second shift register, a third shift register and a fourth shift register.

The PRN uses a modulo-2 addition operator (hereinafter called addition operator) and an exclusive or operator (hereinafter called XOR operator). The XOR operator is equal to the addition operator if and only if the two operators uses modulo-2 arithmetic. However, in the present invention the XOR operator uses modulo-8 arithmetic.

Below an example is made in order to clarify the operation of the operators.

$a=\{0010\ 1011\}$ och $b=\{1000\ 1110\}$.

For XOR the following applies:

$a\text{XOR}b=(0010\ 1011)\text{XOR}(1000\ 1110)=1010\ 0101$, and for addition the following applies:

$a+b=(0010\ 1011)+(1000\ 1110)=1011\ 1001$.

In the XOR operator (a XOR b) the carry bit is removed, but in the addition operator (a+b) the carry bit is rotated one position to the left.

The PRN according to the invention uses the following sequence of events.

The first deterministic signal is fed to the first and the second shift registers and to the second and eight addition operators.

The first shift register rotates the binary sequence and feeds the output signal to the first addition operator.

The first seed signal is fed to the first addition operator. The output from the first addition operator is fed to the first XOR operator.

The second shift register rotates the binary sequence and feeds the output signal to the third addition operator.

The second seed signal is fed to the third addition operator. The output from the third addition operator is fed to the second XOR operator.

The constant signal is fed to the second addition operator and to the fifth addition operator.

The output from the second addition operator is fed to the first XOR operator. The output from the first XOR operator is fed to the second XOR operator. The output from the second XOR operator is fed to the seventh addition operator.

The output from the seventh addition operator is fed to the third shift register, the fifth addition operator, the fourth shift register and a sixth shift register. The sixth shift register rotates the binary sequence.

The output from the fifth addition operator is fed to the third XOR operator.

The third shift register rotates the binary sequence and feeds the output signal to the fourth addition operator. The third seed signal is fed to the fourth addition operator. The output from the fourth addition operator is fed to the third XOR operator.

The output signal from the third XOR operator is fed to the fourth XOR operator.

The fourth shift register rotates the binary sequence. The output from the fourth shift register is fed to the sixth addition operator. The fourth seed signal is fed to the sixth addition operator. The output from the sixth addition operator is fed to the fourth XOR.

The output from the fourth XOR operator is fed to the eight addition operator. The output from the eight addition operator is fed to a fifth shift register. The fifth shift register rotates the binary sequence.

The output from the fifth shift register is added to the output from the sixth shift register. Here added refers to a first bit sequence of a predetermined length being added to a second bit sequence of equal length, giving a total bit sequence length double to the predetermined length.

The main advantage of the present invention is that it is not dependent on any previous state. This means that it is possible to use a deterministic signal together with a known arbitrary seed signal in order to generate a distributed random number with no fault propagation.

The deterministic first signal is an external signal which is used as input for the PRN. The deterministic signal is used for both a PRN placed in the sender and for a PRN placed in the receiver using an output signal from the sender. An example of a suitable deterministic first signal is the clock signal (time signal) comprised in signals from the GPS-system, although many other sources of signals can be envisioned. Examples of other such external clock signals which can be mentioned are clock signals comprised in nationwide television broadcasts, in radio signals for controlling radio controlled clocks and watches, and other satellite navigation systems than the GPS-system.

The PRN according to the invention produces a reliable scrambled signal suitable for one way communication. Since the PRN uses only feed forward control the scrambled signal will not be permanently affected by a disturbance, but the signal will recuperate after the disturbance and the signal will then be free from any fault propagation from the disturbance.

Further advantage of the invention is that the fifth and sixth shift registers decrease the number of addition and XOR operators, thereby making the PRN suitable for use in a system using spread spectrum with high demands on low energy consumption and non-complex systems. If the fifth and sixth shift registers would be removed, the output from the PRN would not produce a highly randomly distributed signal and would not satisfy the below statistical test.

There has been a long felt need for a PRN with feed forward control with a minimum of addition and XOR operators and it has surprisingly been found that a PRN with the following parameters for the shift registers satisfies the requirements of the below statistical test with a minimum use of addition and XOR operators.

The deterministic first signal is a binary signal with a number of 16 bits.

The first shift register rotates the binary sequence seven steps to the left.

The second shift register rotates the binary sequence nine steps to the right.

The third shift register rotates the binary sequence four steps to the left.

The fourth shift register rotates the binary sequence five steps to the right.

The fifth shift register rotates the binary sequence thirteen steps to the left.

The sixth shift register rotates the binary sequence three steps to the right.

The constant signal is fed to a ninth addition operator before the fifth addition operator. The output signal from the ninth addition operator is fed back to the ninth addition operator and to the fifth addition operator. The benefit of this feedback is of diminutive nature, but still gives a somewhat increased stochastic output from the PRN.

The statistical test is as follows:

The seed signal $K_b = \{K_{b1}, K_{b2}, K_{b3}, K_{b4}\}$ is a 64 bits seed signal. The constant signal $C_b$ is an arbitrary 16 bits signal. The deterministic first signal is the clock signal $T_b = \{T_{b1}, T_{b2}\}$ being a 32 bits signal. The output signal $A_b = \{A_{b1}, A_{b2}\}$ from the PRN is a 16 bits signal. The subscript b denotes a binary representation.

The PRN works internally with 16 bits. As mentioned above, the PRN uses a modulo-2 addition operator denoted $\oplus$ and an exclusive or operator denoted $\otimes$.

Furthermore, the shift register is denoted $[\leftarrow N]$ to rotate N step to the left and $[M \rightarrow]$ to rotate M step to the right.

For example;

$00010000 = [\leftarrow N]00000001_{N=4}$, and $00000001 = [M \rightarrow ]00010000_{M=4}$.

In order to evaluate the PRN, a linear discrete clock signal has been used together with the below parameters $T_d(n) = \{n\}_{n=1}^{3500}, \forall n \in Z_+$ $C_d = 278_d$ $K_d = 3221250000_d$ A statistical test is used in order to test if the output signal A from the PRN is a uniformly distributed random variable U[0, 8190] with 16 bits resolution.

The null hypothesis $H_0$ and the alternative hypothesis $H_A$ become:

$H_0$: $A \in U[0, 8190]$ with a significance level of $\alpha$.

$H_A$: $A \notin U[0, 8190]$ with a significance level of $\alpha$.

Here, the random varaiable [0, 8190] has been divided into a number of K sub intervals where K=100 and where the length N for the output signal is N=3500 and where the number of occurrences $A_i$ in the sub interval is denoted $f_j$. The test variable Q is approximately a chi-square distributed stochastic variable and is given by:

$$Q = \frac{K}{N} \sum_{j=1}^{K} \left(f_j - \frac{N}{K}\right)^2.$$

If $Q > X_{K-1, 1-\alpha}^2$ then the null hypothesis $H_0$ is rejected on the significance level $\alpha$, in any other case the null hypothesis $H_0$ is not rejected.

When calculating the different parameters the following is extracted:
Q=70.54286
$X_{K-1, 1-\alpha}^2 = 148.2304$
for $\alpha$=0.001. When $Q < X_{k-1, 1-\alpha}^2$ the null hypothesis $H_0$ is not rejected in the significance level $\alpha$=0.001. Hence, it can be concluded that $A \in U[0, 8190]$.

According to one embodiment of the invention, the PRN comprises a time generator generating the deterministic first signal.

According to one embodiment of the invention, the PRN comprises a constant signal generator generating the second signal.

According to one embodiment of the invention, the PRN comprises a seed signal generator generating the third signal.

The invention also refers to a system for a fast frequency hopping radio. The system comprises a sender and a receiver. Each of the sender and receiver comprising a unit for random frequency generation. The random frequency generating unit of both, the sender and receiver is similar and the random frequency generating units each comprises the PRN according to the above.

The PRN is thus advantageously used in the technology known as "spread spectrum" in order to make a deterministic signal appear stochastic. The "spread spectrum" is a fast frequency hopping. The frequency employed at any given moment in such a system is determined by the PRN. The deterministic signal is known both to the receiver and the transmitter in order to enable the receiver to "follow" the frequencies used by the sender.

The invention also refers to a method for a system for a fast frequency hopping radio. The system comprises the above mentioned sender and receiver. Each of the sender and receiver comprises a unit for random frequency generation. The random frequency generating unit of both the sender and receiver is similar. The random frequency generating units each comprises the PRN performing the steps described above generating random numbers being fed to the random frequency generating unit generating random frequencies dependent on the random numbers.

The advantage of using the PRN and the method in such a communication system is that the random frequency generator produces a reliable frequency spectrum without any fault propagation. This is especially advantageous in a one-way communication system where the receiver does not or cannot confirm to the sender the received information.

BRIEF DESCRIPTION OF DRAWINGS

The invention will below be described in connection with a number of drawings, where:
FIG. 3 schematically shows a system for a fast frequency hopping radio comprising the PRN according to FIGS. 1 and 2.

EMBODIMENT OF THE INVENTION

Figure 1:
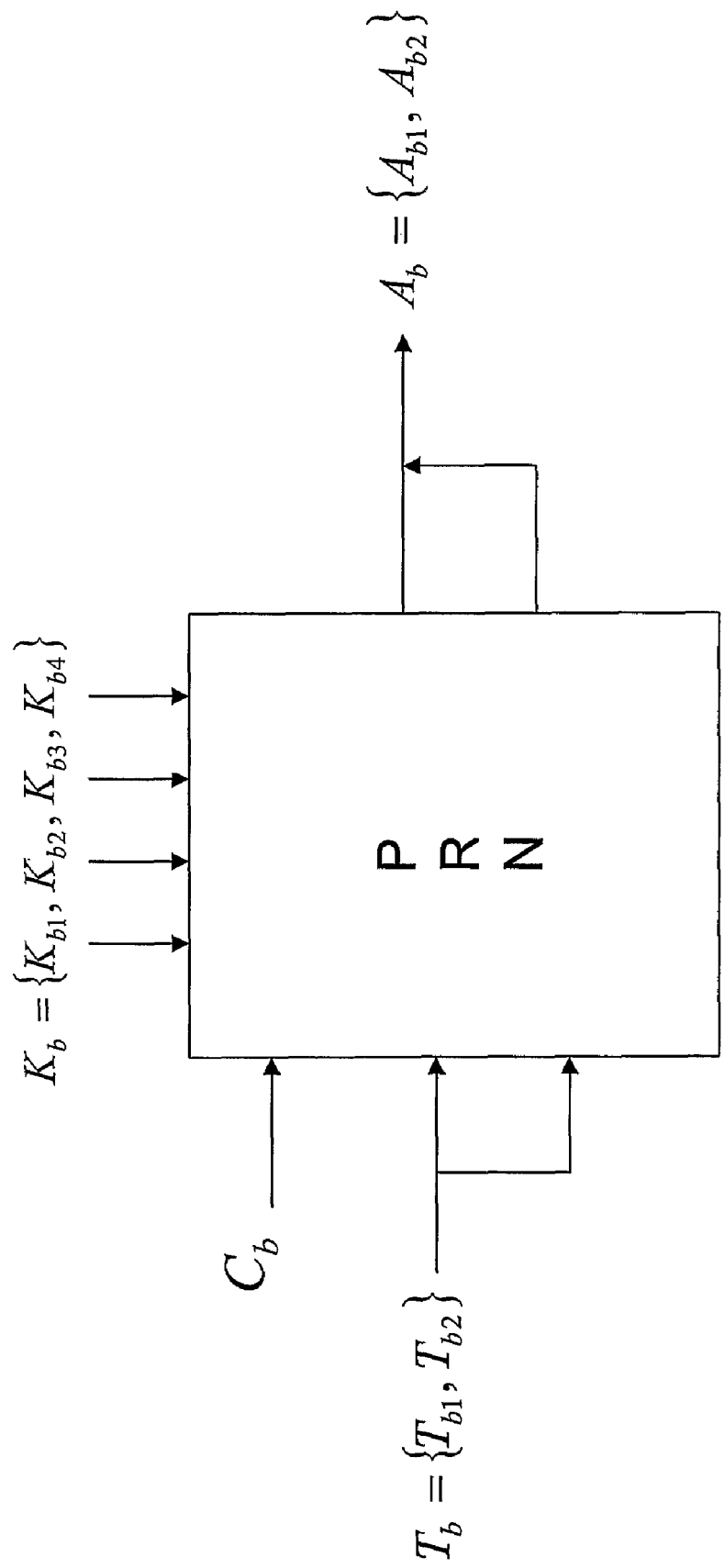
FIG. 1 schematically shows a PRN according to the invention.

FIG. 1 schematically shows a PRN according to the invention. A seed signal $K_b = \{K_{b1}, K_{b2}, K_{b3}, K_{b4}\}$ is a 64 bits seed signal. A constant signal $C_b$ is an arbitrary 16 bits signal. A deterministic first signal is a clock signal $T_b\{T_{b1}, T_{b2}\}$ being a 32 bits signal. An output signal $A_b = \{A_{b1}, A_{b2}\}$ from the PRN is a 32 bits signal. The subscript b denotes a binary representation.

Figure 2:
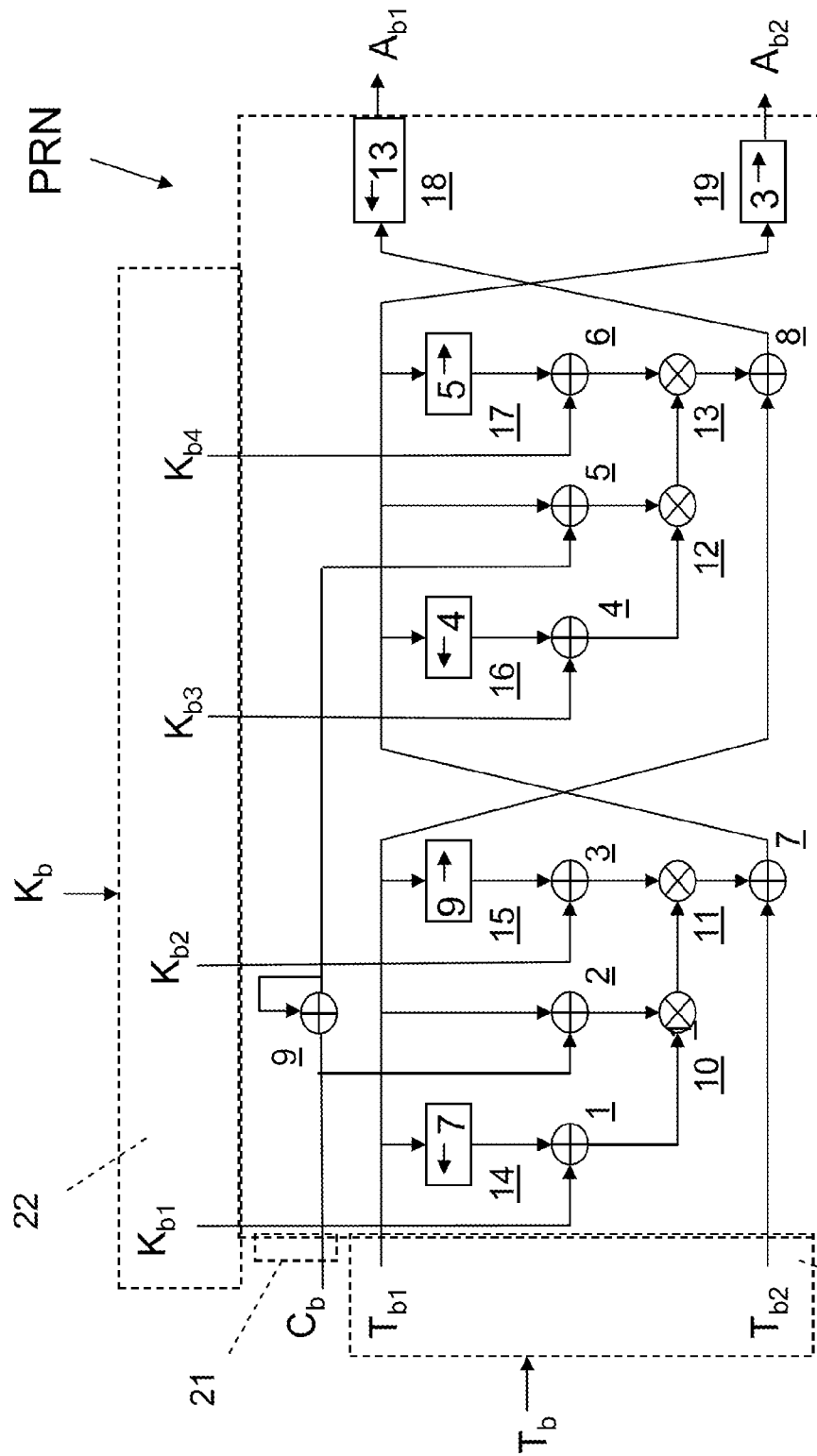
FIG. 2 schematically shows a flow chart of the dataflow in the PRN according to FIG. 1, and where.

FIG. 2 schematically shows a flow chart of the dataflow in the PRN according to FIG. 1. In FIG. 2 the devises comprised in the PRN and the PRN itself are shown with broken lines.

The PRN works internally with 16 bits. The PRN uses nine modulo-2 addition operators 1-9 denoted $\oplus$ and four exclusive or operators 10-13 denoted $\otimes$. The PRN comprises a first shift register 14, a second shift register 15, a third shift register 16 a fourth shift register (17) a fifth shift register 18 and a sixth shift register 19. The shift register is denoted [←N] to rotate N step to the left and [M→] to rotate M step to the right.

The PRN comprises a first input terminal 20, a second input terminal 21 and a third input terminal 22. The first input terminal 20 is arranged to receive the deterministic first signal $T_b$. The second input terminal 21 is arranged to receive the constant signal $C_b$. The third input terminal 22 is arranged to receive the seed signal $K_b$.

The first input terminal 20 divides the deterministic first signal $T_b$ into two equal parts being the first deterministic signal $T_{b1}$ and the second deterministic signal $T_{b2}$. The third input terminal 22 divides the seed signal $K_b$ into four equal parts being the first seed signal $K_{b1}$, the second seed signal $K_{b2}$ the third seed signal $K_{b3}$, and the fourth seed signal $K_{b4}$.

The first deterministic signal $T_{b1}$ is fed to the first and the second shift registers 14, 15 and to the second and eight addition operators 2, 8.

The first shift register 14 rotates the binary sequence seven steps to the left and feeds the output signal to the first addition operator 1.

The first seed signal $K_{b1}$ is fed to the first addition operator 1. The output from the first addition operator 1 is fed to the first XOR operator 10.

The second shift register 15 rotates the binary sequence nine steps to the right and feeds the output signal to the third addition operator 3.

The second seed signal $K_{b2}$ is fed to the third addition operator 3. The output from the third addition operator is fed to the second XOR operator 11.

The constant signal $C_b$ is fed to the second addition operator 2 and to the ninth addition operator 9. The output signal from the ninth addition operator 9 is fed back to the ninth addition operator 9 and to the fifth addition operator 5.

The output from the second addition operator 2 is fed to the first XOR operator 10. The output from the first XOR operator 10 is fed to the second XOR operator 11. The output from the second XOR operator 11 is fed to the seventh addition operator 7.

The output from the seventh addition operator 7 is fed to the third shift register 16, the fifth addition operator 5, the fourth shift register 17 and the sixth shift register 19. The sixth shift register 19 rotates the binary sequence three steps to the right.

The output from the fifth addition operator 5 is fed to the third XOR operator 12.

The third shift register 16 rotates the binary sequence four steps to the left and feeds the output signal to the fourth addition operator 4. The third seed signal $K_{b3}$ is fed to the fourth addition operator 4. The output from the fourth addition operator 4 is fed to the third XOR operator 12.

The output signal from the third XOR operator 12 is fed to the fourth XOR operator 13.

The fourth shift register 17 rotates the binary sequence five steps to the right. The output from the fourth shift register 17 is fed to the sixth addition operator 6. The fourth seed signal $K_{b4}$ is fed to the sixth addition operator 6. The output from the sixth addition operator 6 is fed to the fourth XOR operator 13.

The output from the fourth XOR operator 13 is fed to the eight addition operator 8. The output from the eight addition operator 8 is fed to the fifth shift register 18. The fifth shift register 18 rotates the binary sequence thirteen steps to the left.

The output $A_{b1}$ from the fifth shift register 18 is added to the output $A_{b2}$ from the sixth shift register 19. Here added refers to a first bit sequence of a predetermined length being added to a second bit sequence of equal length, giving a total bit sequence length double to the predetermined length.

FIG. 3 schematically shows a system for a fast frequency hopping radio comprising the PRN according to FIGS. 1 and 2. The system comprises a sender 23 and a receiver 24, each of the sender 23 and receiver 24 comprising a unit for random frequency generation 25, 26. The random frequency generating unit 25, 26 of both the sender 23 and receiver 24 is similar and the random frequency generating units 25, 26 each comprises a random number generating unit PRN according to FIGS. 1 and 2 for random frequency hopping generation.

The invention claimed is:

1. A random number generator (PRN) comprising:
a first input terminal arranged to receive a deterministic first signal ($T_b$);
a second input terminal arranged to receive a second signal ($C_b$) being a constant signal; and
a third input terminal arranged to receive a third signal ($K_b$) being a seed signal, the constant signal ($C_b$) being a binary signal with a number of T bits, the deterministic first signal ($T_b$) being a binary signal with a number of T times 2 bits, the seed signal ($K_b$) being a binary signal with a number of T times 4 bits, the first input terminal receiving the deterministic first signal ($T_b$) in two equal parts being a first deterministic signal ($T_{b1}$) and a second deterministic signal ($T_{b2}$), the third input terminal receiving the seed signal ($K_b$) in four equal parts being a first seed signal ($K_{b1}$), a second seed signal ($K_{b2}$), a third seed signal ($Kb_3$), and a fourth seed signal ($K_{b4}$);
the PRN further comprising six shift registers being a first to sixth shift register, eight addition operators being a first to eighth addition operator, and four exclusive-or (XOR) operators being a first to fourth XOR operator, the PRN arranged to perform a sequence of events wherein:
the first deterministic signal ($T_{b1}$) being received by the first and the second shift registers and the second and eighth addition operators;
the second deterministic signal ($T_{b2}$) being received by the seventh addition operator;
the first shift register rotates a binary sequence and feeds an output signal to the first addition operator;
the first seed signal ($K_{b1}$) being received by the first addition operator, an output from the first addition operator is fed to the first XOR operator;
the second shift register arranged to rotate the binary sequence and feed an output signal to the third addition operator;
the second seed signal ($K_{b2}$) being received by the third addition operator and an output from the third addition operator being received by the second XOR operator;
the constant signal ($C_b$) being received by the second addition operator and the fifth addition operator;
an output from the second addition operator being received by the first XOR operator, an output from the first XOR operator being received by the second XOR operator, an output from the second XOR operator being received by the seventh addition operator;
an output from the seventh addition operator being received by the third shift register, the fifth addition operator, the fourth shift register and the sixth shift register;
the sixth shift register arranged to rotate the binary sequence;
an output from the fifth addition operator being received by the third XOR operator;
the third shift register being arranged to rotate the binary sequence and feed an output signal to the fourth addition operator;
the third seed signal ($K_{b3}$) being received by the fourth addition operator and an output from the fourth addition operator being received by the third XOR operator;
an output from the third XOR operator being received by the fourth XOR operator;
the fourth shift register being arranged to rotate the binary sequence;
an output from the fourth shift register being received by the sixth addition operator and the fourth seed signal ($K_{b4}$) being received by the sixth addition operator and an output from the sixth addition operator being received by the fourth XOR;
an output from the fourth XOR operator being received by the eighth addition operator and an output from the eighth addition operator being received by the fifth shift register and the fifth shift register arranged to rotate the binary sequence;
an output ($A_{b1}$) from the fifth shift register being added to an output ($A_{b2}$) from the sixth shift register; and
a final pseudo-random output being generated by the random number generator (PRN).

2. The random number generator (PRN) according to claim 1, wherein the fifth shift register is arranged to rotate the binary sequence thirteen steps to the left and the sixth shift register is arranged to rotate the binary sequence three steps to the right.

3. The random number generator (PRN) according to claim 2, wherein the first shift register rotates the binary sequence seven steps to the left, the second shift register rotates the binary sequence nine steps to the right, the third shift register rotates the binary sequence four steps to the left, and the fourth shift register rotates the binary sequence five steps to the right.

4. The random number generator (PRN) according to claim 3, wherein the constant signal ($C_b$) is fed to a ninth addition operator before the fifth addition operator and wherein an output signal from the ninth addition operator is fed back to the ninth addition operator and to the fifth addition operator.

5. The random number generator (PRN) according to claim 1, wherein the PRN comprises at least one of a signal generator generating the deterministic first signal ($T_b$), a signal generator generating the second signal ($C_b$), and a signal generator generating the third signal ($K_b$).

6. The random number generator (PRN) according to claim 1, wherein T is equal to 16 bits.

7. The random number generator (PRN) according to claim 1, wherein the addition operators are modulo-2 addition operators.

8. The random number generator (PRN) according to claim 1, wherein the XOR operators are modulo-8 XOR operators.

9. A method for generating random numbers using a random number generator (PRN) having a first input terminal receiving a deterministic first signal ($T_b$), a second input terminal receiving a second signal ($C_b$) being a constant signal and a third input terminal receiving a third signal ($K_b$) being a seed signal, the constant signal ($C_b$) being a binary signal with a number of T bits, the deterministic first signal ($T_b$) being a binary signal with a number of T times 2 bits, the seed signal ($K_b$) being a binary signal with a number of T times 4 bits, the first input terminal receiving the deterministic first signal ($T_b$) in two equal parts being a first deterministic signal ($T_{b1}$) and a second deterministic signal ($T_{b2}$), the third input terminal receives the seed signal ($K_b$) in four equal parts being a first seed signal ($K_{b1}$), a second seed signal ($K_{b2}$), a third seed signal ($K_{b3}$), and a fourth seed signal ($K_{b4}$), the PRN further having a first shift register, a second shift register, a third shift register and a fourth shift register, eight addition operators, being a first to eighth addition operator, four exclusive-or (XOR) operators, being a first to a fourth XOR operators, the method comprises the steps of:

feeding the first deterministic signal ($T_{b1}$) to the first and the second shift register and to the second and eighth addition operators;

feeding the second deterministic signal ($T_{b2}$) to the seventh addition operator;

the first shift register rotating a binary sequence and feeding an output signal to the first addition operator;

feeding the first seed signal ($K_{b1}$) to the first addition operator and feeding an output from the first addition operator to the first XOR operator;

the second shift register rotating the binary sequence and feeding an output signal to the third addition operator;

feeding the second seed signal ($K_{b2}$) to the third addition operator (3) and feeding an output from the third addition operator (3) to the second XOR operator;

feeding the constant signal ($C_b$) to the second addition operator and to the fifth addition operator;

feeding an output from the second addition operator to the first XOR operator and feeding an output from the first XOR operator to the second XOR operator and feeding an output from the second XOR operator to the seventh addition operator;

feeding an output from the seventh addition operator to the third shift register, the fifth addition operator, the fourth shift register and the sixth shift register;

the sixth shift register rotating the binary sequence;

feeding an output from the fifth addition operator to the third XOR operator;

the third shift register rotating the binary sequence and feeding an output signal to the fourth addition operator and feeding the third seed signal ($K_{b3}$) to the fourth addition operator and feeding the output from the fourth addition operator to the third XOR operator;

feeding an output signal from the third XOR operator to the fourth XOR operator;

the fourth shift register rotating the binary sequence;

feeding an output from the fourth shift register to the sixth addition operator and feeding the fourth seed signal ($K_{b4}$) to the sixth addition operator and feeding an output from the sixth addition operator to the fourth XOR operator;

feeding an output from the fourth XOR operator to the eighth addition operator and feeding an output from the eighth addition operator to the fifth shift register and the fifth shift register rotating the binary sequence to the left; and adding output ($A_{b1}$) from the fifth shift register to an output ($A_{b2}$) from the sixth shift register; and generating a final pseudo-random output.

10. The method according to claim 9, wherein the fifth shift register rotates the binary sequence thirteen steps to the left and the sixth shift register rotates the binary sequence three steps to the right.

11. The method according to claim 10, wherein the first shift register rotates the binary sequence seven steps to the left; the second shift register rotates the binary sequence nine steps to the right; the third shift register rotates the binary sequence four steps to the left, and the fourth shift register rotates the binary sequence five steps to the right.

12. The method according to claim 9, wherein the constant signal ($C_b$) is fed to a ninth addition operator before the fifth addition operator and the output signal from the ninth addition operator is fed back to the ninth addition operator and to the fifth addition operator.

13. The method according to claim 9, wherein T is equal to 16 bits.

14. The method according to claim 9, wherein the addition operators perform modulo-2 addition.

15. The method according to claim 9, wherein the XOR operators perform modulo-8 XOR addition.

16. A system for a fast frequency hopping radio, the system comprising a sender and a receiver, each of the sender and receiver comprising a random frequency generating unit for random frequency generation, the random frequency generating unit of both the sender and receiver being similar, wherein said random frequency generating units each comprise for random frequency hopping generation:

a random number generating unit (PRN) having a first input terminal arranged to receive a deterministic first signal ($T_b$);

a second input terminal arranged to receive a second signal ($C_b$) being a constant signal; and a third input terminal arranged to receive a third signal ($K_b$) being a seed signal, the constant signal ($C_b$) being a binary signal with a number of T bits, the deterministic first signal ($T_b$) being a binary signal with a number of T times 2 bits, the seed signal ($K_b$) being a binary signal with a number of T times 4 bits, the first input terminal receiving the deterministic first signal ($T_b$) in two equal parts being a first deterministic signal ($T_b$) and a second deterministic signal ($T_{b2}$), the third input terminal receiving the seed signal ($K_b$) in four equal parts being a first seed signal ($K_{b1}$), a second seed signal ($K_{b2}$), a third seed signal ($Kb_3$), and a fourth seed signal ($K_{b4}$);

the PRN further comprising six shift registers being a first to sixth shift register, eight addition operators being a first to eighth addition operator, and four exclusive-or (XOR) operators being a first to fourth XOR operator, the PRN arranged to perform a sequence of events wherein:

the first deterministic signal ($T_{b1}$) being received by the first and the second shift registers and to the second and eighth addition operators;

the second deterministic signal ($T_{b2}$) being received by the seventh addition operator;

the first shift register rotates an binary sequence and feeds an output signal to the first addition operator;

the first seed signal ($K_{b1}$) being received by the first addition operator, an output from the first addition operator is fed to the first XOR operator;

the second shift register arranged to rotate the binary sequence and feed an output signal to the third addition operator;

the second seed signal ($K_{b2}$) being received by the third addition operator and an output from the third addition operator being received by the second XOR operator;

the constant signal ($C_b$) being received by the second addition operator and the fifth addition operator;

an output from the second addition operator being received by the first XOR operator, an output from the first XOR operator being received by the second XOR operator, an output from the second XOR operator being received by the seventh addition operator;

an output from the seventh addition operator being received by the third shift register, the fifth addition operator, the fourth shift register and the sixth shift register;

the sixth shift register arranged to rotate the binary sequence;

an output from the fifth addition operator being received by the third XOR operator;

the third shift register being arranged to rotate the binary sequence and feed an output signal to the fourth addition operator;

the third seed signal ($K_{b3}$) being received by the fourth addition operator and an output from the fourth addition operator being received by the third XOR operator;

an output from the third XOR operator being received by the fourth XOR operator;

the fourth shift register being arranged to rotate the binary sequence;

an output from the fourth shift register being received by the sixth addition operator and the fourth seed signal ($K_{b4}$) being received by the sixth addition operator and the output from the sixth addition operator being received by the fourth XOR;

an output from the fourth XOR operator being received by the eighth addition operator and an output from the eighth addition operator being received by the fifth shift register and the fifth shift register arranged to rotate the binary sequence;

an output ($A_{b1}$) from the fifth shift register being added to an output ($A_{b2}$) from the sixth shift register; and a final pseudo-random output being generated.

17. A method of generating random numbers, the method comprising:

wherein a system includes a sender and a receiver, each of the sender and receiver including a random frequency generating unit for random frequency generation, the random frequency generating unit of both the sender and receiver being similar, wherein said random frequency generating units each includes a random number generating unit (PRN);

using a random number generator (PRN) having a first input terminal receiving a deterministic first signal ($T_b$), a second input terminal receiving a second signal ($C_b$) being a constant signal and a third input terminal receiving a third signal ($K_b$) being a seed signal, the constant signal ($C_b$) being a binary signal with a number of T bits, the deterministic first signal ($T_b$) being a binary signal with a number of T times 2 bits, the seed signal ($K_b$) being a binary signal with a number of T times 4 bits, the first input terminal receiving the deterministic first signal ($T_b$) in two equal parts being a first deterministic signal ($T_{b1}$) and a second deterministic signal ($T_{b2}$), the third input terminal receives the seed signal ($K_b$) in four equal parts being a first seed signal ($K_{b1}$), a second seed signal ($K_{b2}$), a third seed signal ($K_{b3}$), and a fourth seed signal ($K_{b4}$), the PRN further having a first shift register, a second shift register, a third shift register and a fourth shift register, eight addition operators, being a first to eighth addition operator, four exclusive-or (XOR) operators, being a first to the fourth XOR operators, the method further comprising the steps of:

feeding the first deterministic signal ($T_{b1}$) to the first and the second shift register and to the second and eighth addition operators;

feeding the second deterministic signal ($T_{b2}$) to the seventh addition operator; the first shift register rotating a binary sequence and feeding an output signal to the first addition operator;

feeding the first seed signal ($K_{b1}$) to the first addition operator and feeding an output from the first addition operator to the first XOR operator;

the second shift register rotating the binary sequence and feeding an output signal to the third addition operator;

feeding the second seed signal ($K_{b2}$) to the third addition operator (3) and feeding an output from the third addition operator (3) to the second XOR operator;

feeding the constant signal ($C_b$) to the second addition operator and to the fifth addition operator;

feeding an output from the second addition operator to the first XOR operator and feeding an output from the first XOR operator to the second XOR operator and feeding an output from the second XOR operator to the seventh addition operator;

feeding an output from the seventh addition operator to the third shift register, the fifth addition operator, the fourth shift register and the sixth shift register;

the sixth shift register rotating the binary sequence;

feeding an output from the fifth addition operator to the third XOR operator;

the third shift register rotating the binary sequence and feeding an output signal to the fourth addition operator and feeding the third seed signal ($K_{b3}$) to the fourth addition operator and feeding an output from the fourth addition operator to the third XOR operator;

feeding an output signal from the third XOR operator to the fourth XOR operator;

the fourth shift register rotating the binary sequence;

feeding an output from the fourth shift register to the sixth addition operator and feeding the fourth seed signal ($K_{b4}$) to the sixth addition operator and feeding an output from the sixth addition operator to the fourth XOR operator;

feeding an output from the fourth XOR operator to the eighth addition operator and feeding an output from the eighth addition operator to the fifth shift register and the fifth shift register rotating the binary sequence to the left;

adding an output ($A_{b1}$) from the fifth shift register to an output ($A_{b2}$) from the sixth shift register; and generating a final pseudo-random output.

* * * * *

UNITED STATES PATENT AND TRADEMARK OFFICE
CERTIFICATE OF CORRECTION

PATENT NO. : 8,412,758 B2
APPLICATION NO. : 12/097205
DATED : April 2, 2013
INVENTOR(S) : Numminen It is certified that error appears in the above-identified patent and that said Letters Patent is hereby corrected as shown below:

In the Specification:

In Column 1, Line 11, delete "PrimeModulus" and insert - - Prime Modulus - -, therefor.

In Column 1, Line 35, delete "transmitter" and insert - - transmitter. - -, therefor.

In Column 4, Line 54, delete "$K_d=3221250000_d$" and insert - - $K_d=3221250000_d$. - -, therefor.

In Column 4, Line 62, delete "varaiable" and insert - - variable - -, therefor.

In Column 6, Line 6, delete "$T_b\{T_{b1}, T_{b2}\}$" and insert - - $T_b=\{T_{b1}, T_{b2}\}$ - -, therefor.

In Column 6, Line 32, delete "$K_{b2}$" and insert - - $K_{b2}$, - -, therefor.

In the Claims:

In Column 7, Line 29, in Claim 1, delete "(PRN)".

In Column 7, Line 46, in Claim 1, delete "PRN" and insert - - random number generator - -, therefor.

In Column 7, Line 50, in Claim 1, delete "PRN" and insert - - random number generator - -, therefor.

In Column 8, Line 2, in Claim 1, delete "and the fifth addition operator;" and insert - - ; - -, therefor.

In Column 8, Lines 13-14, in Claim 1, delete "binary sequence;" and insert - - output from the seventh addition operator; - -, therefor.

Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,412,758 B2

In Column 8, Lines 17-18, in Claim 1, delete "binary sequence" and insert - - output from the seventh addition operator - -, therefor.

In Column 8, Lines 25-26, in Claim 1, delete "binary sequence;" and insert - - output from the seventh addition operator; - -, therefor.

In Column 8, Line 31, in Claim 1, delete "XOR;" and insert - - XOR operator; - -, therefor.

In Column 8, Line 36, in Claim 1, delete "binary sequence;" and insert - - output from the eighth addition operator; - -, therefor.

In Column 8, Lines 38-40, in Claim 1, delete "register; and a final pseudo-random output being generated by the random number generator (PRN)." and insert - - register to generate a final pseudo-random output. - -, therefor.

In Column 8, Line 41, in Claim 2, delete "(PRN)".

In Column 8, Line 43, in Claim 2, delete "binary sequence" and insert - - output from the eighth addition operator - -, therefor.

In Column 8, Line 44, in Claim 2, delete "binary sequence" and insert - - output from the seventh addition operator - -, therefor.

In Column 8, Line 46, in Claim 3, delete "(PRN)".

In Column 8, Line 50, in Claim 3, delete "binary sequence" and insert - - output from the seventh addition operator - -, therefor.

In Column 8, Line 51, in Claim 3, delete "binary sequence" and insert - - output from the seventh addition operator - -, therefor.

In Column 8, Line 53, in Claim 4, delete "(PRN)".

In Column 8, Line 58, in Claim 5, delete "(PRN)".

In Column 8, Line 59, in Claim 5, delete "PRN" and insert - - random number generator - -, therefor.

In Column 8, Line 63, in Claim 6, delete "(PRN)".

In Column 8, Line 65, in Claim 7, delete "(PRN)".

In Column 9, Line 1, in Claim 8, delete "(PRN)".

In Column 9, Line 4, in Claim 9, delete "(PRN)".

CERTIFICATE OF CORRECTION (continued)
U.S. Pat. No. 8,412,758 B2

In Column 9, Line 19, in Claim 9, delete "PRN" and
insert - - random number generator - -, therefor.

In Column 9, Line 20, in Claim 9, delete "register and" and insert - - register, - -, therefor.

In Column 9, Line 20, in Claim 9, delete "register," and insert - - register, a fifth
shift register, and a sixth shift register, - -, therefor.

In Column 9, Line 22, in Claim 9, delete "to a" and insert - - to - -, therefor.

In Column 9, Line 38, in Claim 9, delete "(3)".

In Column 9, Line 39, in Claim 9, delete "(3)".

In Column 9, Line 41, in Claim 9, delete "and to the fifth addition operator;" and
insert - - ; - -, therfor.

In Column 9, Line 50, in Claim 9, delete "binary sequence;" and
insert - - output from the seventh addition operator; - -, therefor.

In Column 9, Line 53, in Claim 9, delete "binary sequence and" and
insert - - output from the seventh addition operator; - -, therefor.

In Column 9, Line 60, in Claim 9, delete "binary sequence;" and
insert - - output from the seventh addition operator; - -, therefor.

In Column 10, Line 2, in Claim 9, delete "binary sequence" and
insert - - output from the eighth addition operator - -, therefor.

In Column 10, Lines 5-6, in Claim 9, delete "register; and generating a final
pseudo-random output." and insert - - register to generate a final pseudo-random
output. - -, therefor.

In Column 10, Line 8, in Claim 10, delete "binary sequence" and
insert - - output from the eighth addition operator - -, therefor.

In Column 10, Line 9, in Claim 10, delete "binary sequence" and
insert - - output from the seventh addition operator - -, therefor.

In Column 10, Lines 14-15, in Claim 11, delete "binary sequence
four steps to the left," and insert -- output from the seventh addition
operator four steps to the left; --, therefor.

CERTIFICATE OF CORRECTION (continued)
U.S. Pat. No. 8,412,758 B2

In Column 10, Line 16, in Claim 11, delete "binary sequence" and insert - - output from the seventh addition operator - -, therefor.

In Column 10, Line 19, in Claim 12, delete "and the" and insert - - and - -, therefor.

In Column 10, Line 35, in Claim 16, delete "(PRN)".

In Column 10, Line 47, in Claim 16, delete "($T_b$)" and insert - - ($T_{b1}$) - -, therefor.

In Column 10, Line 52, in Claim 16, delete "PRN" and insert - - random number generating unit - -, therefor.

In Column 10, Line 56, in Claim 16, delete "PRN" and insert - - random number generating unit - -, therefor.

In Column 10, Line 59, in Claim 16, delete "and to" and insert - - and - -, therefor.

In Column 10, Line 63, in Claim 16, delete "an" and insert - - a - -, therefor.

In Column 11, Line 8, in Claim 16, delete "and the fifth addition operator;" and insert - - ; - -, therefor.

In Column 11, Lines 18-19, in Claim 16, delete "binary sequence;" and insert - - output from the seventh addition operator; - -, therefor.

In Column 11, Lines 22-23, in Claim 16, delete "binary sequence" and insert - - output from the seventh addition operator - -, therefor.

In Column 11, Lines 30-31, in Claim 16, delete "binary sequence;" and insert - - output from the seventh addition operator; - -, therefor.

In Column 11, Line 35, in Claim 16, delete "the output" and insert - - output - -, therefor.

In Column 11, Line 36, in Claim 16, delete "XOR;" and insert - - XOR operator; - -, therefor.

In Column 11, Line 41, in Claim 16, delete "binary sequence;" and insert - - output from the eighth addition operator; - -, therefor.

In Column 11, Lines 43-44, in Claim 16, delete "register; and a final pseudo-random output being generated." and insert - - register to generate a final pseudo-random output. - -, therefor.

In Column 11, Line 53, in Claim 17, delete "(PRN);" and insert - - ; - -, therefor.

CERTIFICATE OF CORRECTION (continued)
U.S. Pat. No. 8,412,758 B2

In Column 11, Line 54, in Claim 17, delete "a random number generator (PRN)" and insert - - the random number generating unit - -, therefor.

In Column 12, Line 7, in Claim 17, delete "PRN" and insert - - random number generating unit - -, therefor.

In Column 12, Line 8, in Claim 17, delete "register and" and insert - - register, - -, therefor.

In Column 12, Line 9, in Claim 17, delete "register," and insert - - register, a fifth shift register, and a sixth shift register, - -, therefor.

In Column 12, Line 11, in Claim 17, delete "to the" and insert - - to - -, therefor.

In Column 12, Line 26, in Claim 17, delete "(3)".

In Column 12, Line 27, in Claim 17, delete "(3)".

In Column 12, Line 29, in Claim 17, delete "and to the fifth addition operator;" and insert - - ; - -, therefor.

In Column 12, Line 38, in Claim 17, delete "binary sequence;" and insert - - output from the seventh addition operator; - -, therefor.

In Column 12, Line 41, in Claim 17, delete "binary sequence" and insert - - output from the seventh addition operator - -, therefor.

In Column 12, Line 48, in Claim 17, delete "binary sequence;" and insert - - output from the seventh addition operator; - -, therefor.

In Column 12, Line 57, in Claim 17, delete "binary sequence" and insert - - output from the eighth addition operator - -, therefor.

In Column 12, Lines 59-60, in Claim 17, delete "register; and generating a final pseudo-random output." and insert - - register to generate a final pseudo-random output. - -, therefor.